Patented July 16, 1940

2,207,997

UNITED STATES PATENT OFFICE 2,207,997

PLASTIC COMPOSITION

Robert P. Courtney, Bloomfield, N. J., assignor to Bakelite Corporation, New York, N. Y., a corporation of Delaware No Drawing. Application April 23, 1937,
Serial No. 138,535

5 Claims. (Cl. 260—9)

This invention relates to plastic compositions consisting of binders and fillers of cellulosic or mineral material, and used for filling holes, cracks, etc., for the repair of broken or damaged articles particularly wooden articles such as furniture or the like, for decorative purposes as in modeling or for ornamentation by the production of surfaces in relief or semi-relief, and similar purposes.

Compositions intended for such purposes have been previously compounded from fibrous fillers and dispersions of natural resins or cellulose esters as binders. These materials have not proven satisfactory due to the fact that on evaporation of solvent they undergo a dimensional change, particularly in a lateral direction, and in consequence tend to pull away from the sides of fissures or cavities to leave an unsightly seam or joint. Again such compositions dry too rapidly and, while the addition of high boiling plasticizers has been proposed, they can only be added in quantities that are usually insufficient to give the proper plastic working qualities desired if the drying time is not to be prolonged. Drying oils have also been added; but these, while giving to the compositions a certain degree of pliability and formability retard the setting to an objectionable degree. A composition is therefore desired with the properties of undergoing little dimensional change, possessing and retaining a pliability and formability such that it may easily be worked and modeled into the desired shape, yet setting to a hard, resistant product thereafter in a brief time.

It has now been found that compositions with the foregoing properties can be prepared from synthetic phenolic resins and fatty oils, particularly if the resins are dispersed in the oils in the presence of a metallic oxide such as zinc oxide, and the resulting dispersions then heated to temperatures of 230–270 C. for a relatively long period of time, i. e., 2–3 hours, or until the composition attains a highly viscous body characterized by an acetone-insolubility of 30 per cent or more. The product, however, is dispersible in hydrocarbon thinners, such as toluol or xylol due to the presence of the metal oxide which acts as a control agent. A resulting toluene or xylene dispersion, therefore, contains the oil-resin metallic oxide composition in an advanced state of polymerization, and unlike other oil compositions dries by solvent evaporation with substantially no oxidation or further polymerization of resin-oil metallic oxide complex. On simple air drying it deposits a hardened and reacted film; and this probably accounts for the lack of dimensional change in these materials, since little or no change either chemical or physical is found to occur in the dried film.

An illustration of the preparation of plastic compositions in accordance with this invention is that of first preparing an oil-soluble resin by reacting 100 parts of para phenyl phenol with 75 parts of formalin (40% aqueous formaldehyde) at 130° C. for about 3½ hours, and then dehydrating under atmospheric pressure to 110° C. and further if desired under vacuum to 118° C. 14.5 parts of this resin are added to 15 parts of a 50-50 mixture of zinc oxide ground in tung oil and heated with an additional 19 parts of tung oil and 1½ parts castor oil to a temperature of 250° C. in the course of 40 minutes and maintained for about 2 hours. The mixture is then thinned with 50 parts toluene, giving a dispersion which is cream colored and having a viscosity of 1800 to 2400 kv. when thinned with an equal portion of toluene. 100 parts of the resin dispersion, thinned with 100 parts toluol and 100 parts acetone, are then kneaded with 200 parts of wood flour, and if desired about 50 parts of starch, until a dough- or putty-like mass of uniform consistency is obtained.

An improved composition can be prepared by increasing the quantity of resin dispersion in the above sample to 150 parts. If a somewhat more plastic composition is desired 15 to 20 parts of blown castor oil or heavy bodied varnish may be added.

The oil-soluble resin used in making the resin-oil-zinc oxide composition may be prepared from other phenols, as for example, the alkyl and aryl substituted phenols of which butyl or amyl phenol or benzyl phenol are instances. Suitable fatty oils as substitutes in whole or in part for tung oil include linseed oiticica, soya bean, fish, Perilla, sunflower, poppy seed and other drying and semi-drying oils; non-drying oils as rape, cotton seed, corn, etc., can be used in part, and the oils can be bodied by heating or blowing. Oxides of other metals can be used in place of zinc oxide such as lead, magnesium, calcium, or their hydroxides, naphthenates, tungates, etc., other metallic soaps, carbon black, etc., can be substituted. Plasticizers such as dibutyl phthalate, tricresyl phosphate and the like may be added if desired. The wood flour may be replaced in whole or in part by clay, silica, marble dust or other non-fibrous fillers.

Such a composition dries readily, but not so rapidly that it is not plastic and easily workable.

Used as a filler the material suffers little dimensional change and does not pull away from the sides of the crevices, holes or fissures which it is intended to fill; but it gives instead a permanent repair with complete freedom from unsightly voids and seams, and a coherent, uniform, smooth surface of great permanency which can be finished in any desired manner by sanding, rubbing, polishing or the like. Moreover in drying there is a tendency for the resin in the composition to concentrate on the surface such that a hard, solvent and alkali resistant surface is formed which effectively seals the cavity or depression which has been filled.

Articles molded or modeled from a composition of this invention are found to be resilient and non-brittle and accordingly not readily chipped by friction or ordinary impact. When hardened they are not affected by common solvents as gasoline, water, etc., and do not blister or break upon heating. They can be mechanically worked and polished and colored or stained as desired. In appearance and characteristics they resemble wood, when wood flour filler is used, but without the tendency to crack like wood, and they do not deteriorate on aging.

What is claimed is:

1. Process of preparing a plastic composition which comprises forming an oil-soluble resin from a substituted phenol, removing water therefrom, heating the resin with tung oil in the presence of zinc oxide at a temperature of 230° C. or more for about 2 hours or longer, dispersing the product in a hydrocarbon thinner, and kneading the dispersion with a filler including wood flour to give a putty-like mass.

2. Process of preparing a plastic composition which comprises forming an oil-soluble phenol resin, heating the resin together with an oil in the presence of a control agent selected from the group consisting of the oxides, hydroxides, naphthenates and tungates of zinc, lead, magnesium and calcium and metallic soaps to advance polymerization while maintaining dispersibility in a hydrocarbon thinner, dispersing the product in a hydrocarbon thinner, and kneading the dispersion with a filling material to give a putty-like mass.

3. Plastic composition of a dough-like consistency comprising a filler of wood flour and a dispersion in a hydrocarbon thinner of a binder including tung oil, an oil-soluble substituted phenol resin and an agent selected from the group consisting of the oxides, hydroxides, naphthenates and tungates of zinc, lead, magnesium and calcium and metallic soaps, said binder being in an advanced state of polymerization characterized by an acetone-insolubility of thirty per cent or more.

4. Plastic composition of a dough-like consistency comprising a filling material and a dispersion in a hydrocarbon thinner of a binder including a fatty oil and a phenol resin soluble in the oil together with an agent selected from the group consisting of the oxides, hydroxides, naphthenates and tungates of zinc, lead, magnesium and calcium and metallic soaps for maintaining dispersibility of the binder in the thinner, said binder being in an advanced stage of polymerization characterized by an acetone-insolubility of 30 per cent or more.

5. Plastic composition of a dough-like consistency comprising a filling material and a dispersion in a hydrocarbon thinner of a binder including a resin prepared from a substituted phenol and dispersed with the aid of an agent selected from the group consisting of the oxides, hydroxides, naphthenates and tungates of zinc, lead, magnesium and calcium and metallic soaps in a fatty oil, said binder being in an advanced stage of polymerization characterized by an acetone-insolubility of 30% or more and drying upon evaporation of the thinner to a hardened reacted condition of the binder.

ROBERT P. COURTNEY.